Dec. 3, 1946.   D. F. WARNER ET AL   2,412,071
CABIN SUPERCHARGING MEANS HAVING AUTOMATIC PRESSURE
AND TEMPERATURE CONTROL MEANS
Filed July 22, 1944    2 Sheets-Sheet 1

Inventors:
Donald F. Warner,
Earl L. Auyer,
by Harry E. Dunham
Their Attorney.

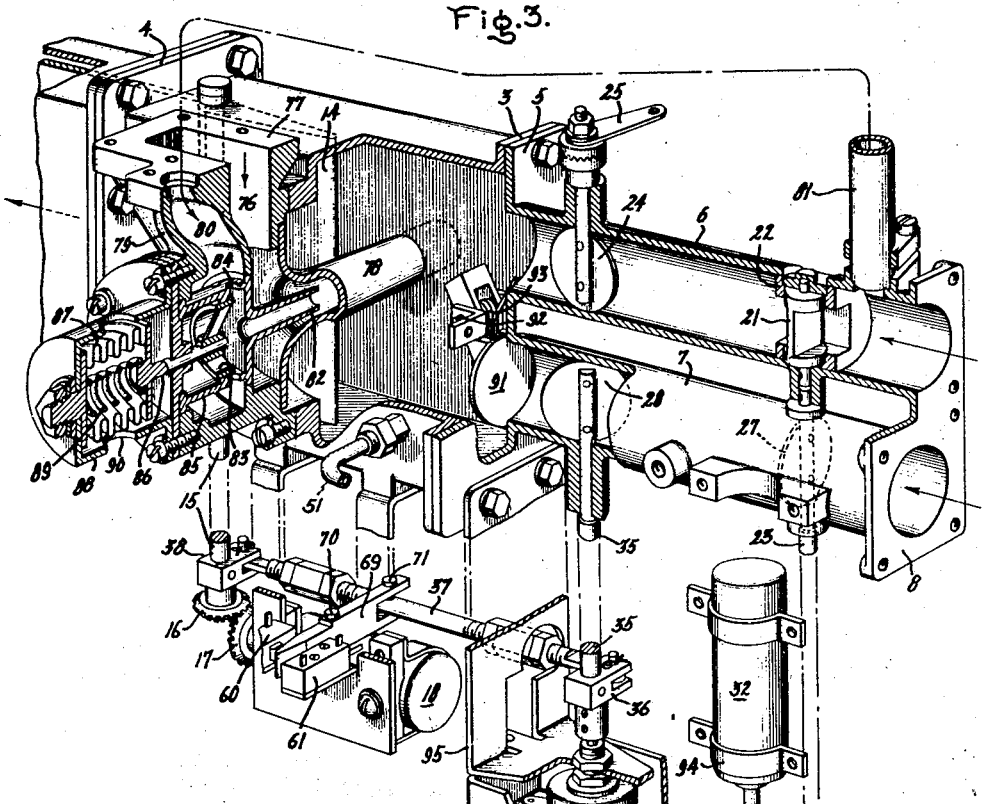
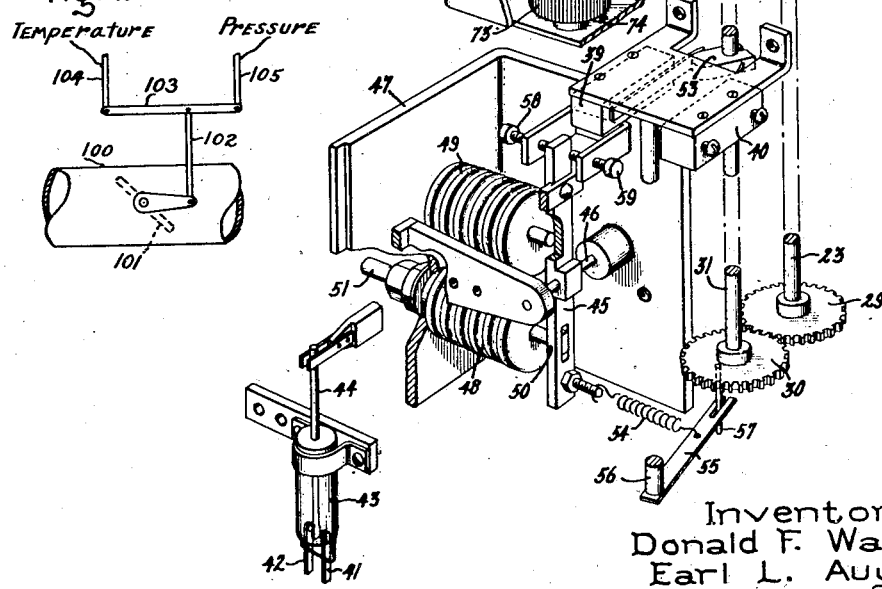

Patented Dec. 3, 1946

2,412,071

UNITED STATES PATENT OFFICE 2,412,071

CABIN SUPERCHARGING MEANS HAVING AUTOMATIC PRESSURE AND TEMPERATURE CONTROL MEANS

Donald F. Warner and Earl L. Auyer, Swampscott, Mass., assignors to General Electric Company, a corporation of New York Application July 22, 1944, Serial No. 546,717

13 Claims. (Cl. 98—1.5)

The present invention relates to cabin supercharger systems such as are used on aircraft and has for its object to provide an improved system for supplying supercharged air to a cabin and regulating its pressure, temperature and rate of flow.

For a consideration of what we believe to be novel and our invention, attention is directed to the following specification and to the claims appended thereto.

Figure 1:
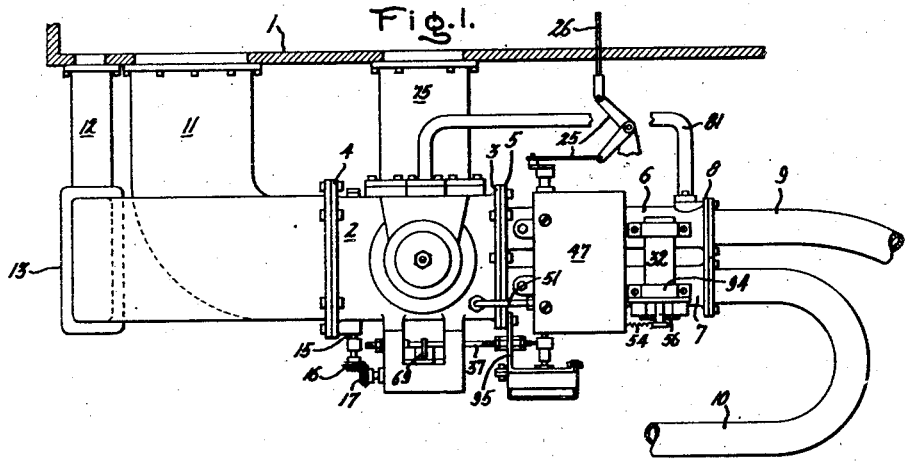
Figure 2:
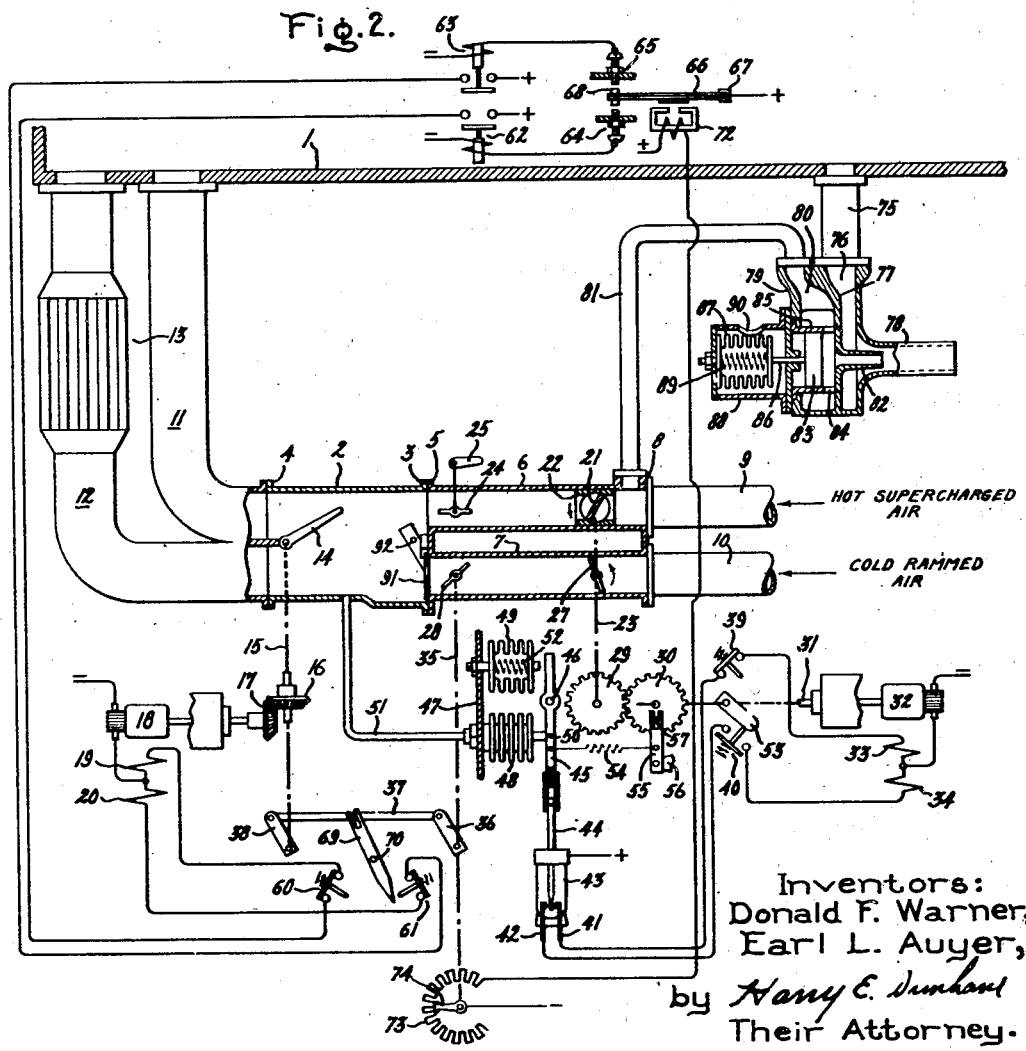

In the drawings, Fig. 1 is a side view of a cabin supercharger structure embodying our invention, it being shown attached to a cabin wall of an aircraft cabin; Fig. 2 is a diagrammatic view illustrating our system; Fig. 3 is a perspective exploded view of a portion of the structure shown in Fig. 1, and Fig. 4 is a detail view of a modification.

Referring to the drawings, I indicates the cabin of an aircraft which is to be supercharged, ventilated and heated. As shown in Fig. 1, our improved mechanism comprises a unitary structure which is bolted directly to a wall of the cabin as a unit. It comprises a rectangular casing 2 which forms a mixing chamber, is open at its two ends and is provided with end bolting flanges 3 and 4. Attached to bolting flange 3 is an end wall 5 formed integral with the adjacent ends of two conduits 6 and 7 which at their other ends are integral with a second end wall 8. Attached to end wall 8 and communicating with conduit 6 is a pipe line 9 which leads from a source of hot pressurized or supercharged air. For example, it may be a branch pipe line connected with the discharge side of the compressor of a turbosupercharger or of a gas turbine power plant. Thus there is supplied through pipe 9 air of a temperature and pressure both higher than that desired for the cabin. Attached to end wall 8 and communicating with conduit 7 is a pipe line 10 which terminates in an open end facing into the aircraft slip stream or communicates with a plenum chamber having an opening facing into the slip stream. Thus there is supplied through pipe line 10 to conduit 7 rammed atmospheric air, the pressure and temperature of which may vary widely with the speed and altitude of the aircraft.

Connected to bolting flange 4 are walls which define two conduits 11 and 12 which at one end communicate with the mixing chamber of casing 2 and at the other end are connected to the cabin. They serve to convey air from the mixing chamber to the cabin. In conduit 12 is a cooler 13 for cooling the air flowing through conduit 12 to the cabin. It may be of any suitable type and may utilize air from the slip stream of the aircraft for cooling medium. It is shown diagrammatically as comprising cooling tubes through which the air flows to the cabin and over which the slipstream air flows. Airflow from the mixing chamber through conduits 11 and 12 is apportioned between them by a flap valve 14 carried by a shaft 15 pivoted in walls of casing 2. On one end, it is provided with a bevel gear 16 which meshes with a bevel gear 17 on the shaft of a reversing electric motor 18, the two field windings of which are indicated at 19 and 20. Motor 18 is carried by a suitable bracket depending from and secured to housing 2 as shown clearly in Figs. 1 and 3.

Airflow through conduit 6 is controlled by a rotary valve 21 mounted in a casing 22. Valve 21 rotates in a counterclockwise direction as indicated by the arrow in Fig. 2 and the arrangement is such that it must rotate through a predetermined angle before it starts to open. It is mounted on a shaft 23 pivoted in walls of conduits 6 and 7. Also, in conduit 6 beyond valve 21 as regards the flow of air through conduit 6 is a valve 24 which is manually operated, it being normally in open position, as shown in Fig. 2. The arrangement is such that it may be operated from within the cabin. To this end, it may be connected by suitable links and levers 25, as indicated particularly in Fig. 1, to an operating rod 26 which terminates at a suitable point within the cabin.

Flow of air through conduit 7 is controlled by two valves 27 and 28. Valve 27 is mounted on shaft 23 so that it rotates in unison with valve 21. The shaft 23 is provided on its outer end with a gear 29 which meshes with a gear 30 mounted on the shaft 31 of a reversing electric motor 32, the fields of which are indicated at 33 and 34. Valve 28 is mounted on a shaft 35 pivoted in the wall of conduit 7. On its outer end, it is provided with an arm 36 connected by a link 37 to an arm 38 fixed on shaft 15. Thus, it will be seen that valves 14 and 28 are both connected to motor 18 and are operated by it.

The reversing fields 33 and 34 of motor 32 are connected through limit switches 39 and 40 to the stationary contacts 41 and 42 of a vacuum switch 43. The movable contact 44 of vacuum switch 43, which is pivoted in the end wall of the vacuum switch, is connected at its outer end to a lever 45 carried by a pivot pin 46 mounted in a casing 47. Mounted on a wall of casing 47 on opposite sides of pivot pin 46 are two corrugated bellows 48 and 49. The movable end of bellows 48 is pivotally connected to lever 45 as is indicated at 50 (see Fig. 3). Its interior is connected by a pipe 51 to the mixing chamber formed by casing 2. Thus, bellows 48 is subjected on its interior to the pressure in the mixing chamber which pressure is used as a measure of the pressure in the cabin. Bellows 49 is evacuated and is provided on its interior with a spring 52 which acts normally in a direction to distend the bellows. Bellows 49 and spring 52 have a characteristic such that below a certain altitude the movable end of the bellows is not in engagement with lever 45, but after reaching a certain altitude the movable end engages lever 45 and is adapted to effect movement of the lever. Bellows 48 and 49 are both subjected on their outsides to ambient pressure. Bellows 48 and 49 form means responsive to the pressure in the cabin which means controls motor 32 to effect adjustment of valves 21 and 27. On motor shaft 31 is an arm 53 which operates the limit switches 39 and 40. To give width of regulation to bellows 48 and 49 so as to obtain stable operation of the control mechanism, there is provided a spring 54 which at one end is connected to lever 45 and at the other end is connected to an arm 55 pivoted on a fixed support 56 and having its other end provided with a notch which engages a pin 57 carried by gear 30. Thus turning of gear 30 to adjust valves 21 and 27 serves also to adjust the tension of spring 54. At 58 and 59 (see Fig. 3) are adjustable stops for limiting turning movement of lever 45.

The fields 19 and 20 of motor 18 are connected through limit switches 60 and 61 and relays 62 and 63 to the fixed contacts 64 and 65 of a temperature responsive device located in the cabin and responsive to the temperature therein. In the present instant, the temperature responsive device is shown as being in the form of a bi-metal strip 66 fixed at one end 67 and provided with a contact 68 at its other end adapted to engage fixed contacts 64 and 65. Connected with link 37 is a pivoted arm 69 which functions to operate the limit switches 60 and 61. Arm 69 is pivoted on a fixed support as indicated at 70 and is connected to link 37 by a suitable pivotal connection as indicated at 71 (see Fig. 3). To give width of regulation to the temperature responsive device so as to effect stable operation, there is provided in connection with it an electromagnet 72 the armature of which is attached to bi-metal strip 66. The winding of electromagnet 72 is in circuit with a rheostat 73, the operating arm 74 of which is attached to shaft 35. Operating arm 74 is moved along with valves 14 and 28 to vary the amount of resistance in circuit with the winding of electromagnet 72 as the valves are adjusted, thus varying the strength of the electromagnet and hence its effect on the thermostatic bimetal strip.

Flow of air from the cabin is through a conduit 75 which leads to an air chamber 76 formed by walls 77 which in turn are bolted to the side of casing 2 and form a part of one side wall thereof. Projecting from the one wall 77 is a discharge nozzle 78 which extends across the mixing chamber formed by casing 2 and projects out beyond casing 2 to communicate with atmosphere. This is best shown in Fig. 3. In the diagrammatic showing in Fig. 2, these ports are shown separated from casing 2 for purposes of illustration. Thus air from the cabin may flow through conduit 75 to chamber 76 and thence through nozzle 78 to atmosphere. For use in effecting flow of air from the cabin to atmosphere under certain operating conditions, there is provided an ejector which utilizes as operating fluid supercharged air taken preferably from conduit 9 in advance of valve 21. To this end, there are provided in connection with the outer of the walls 77, walls 79 which define a pressure air chamber 80. Air chamber 80 is connected by a pipe 81 to conduit 6 in advance of valve 21. Connected with chamber 80 is a discharge nozzle 82 which projects across air chamber 76 and terminates at the throat of discharge nozzle 78 to form with the discharge nozzle an ejector of known construction. Flow of air from chamber 80 to discharge nozzle 82 is controlled by a sliding valve 83 which controls ports 84 located in a cylinder 85 which extends across chamber 80. Valve 83 is provided with a stem 86 which projects out through wall 79 and is connected to the movable end of a corrugated bellows 87 supported in a housing cap 88. Corrugated bellows 87 is evacuated and is provided on its inside with a compression spring 89 which acts in a direction to distend the bellows. The interior of cap 88 is connected to atmosphere through one or more openings 90. Thus, corrugated bellows 78 is subjected on its outside to ambient pressure and, as the ambient pressure decreases, sliding valve 83 is moved toward a position wherein it covers ports 84. When ports 84 are covered, flow of supercharged air to the ejector nozzle 82 is cut off, thus putting the ejector out of operation.

Over the discharge end of conduit 7 is a flap valve 91 pivoted on a pin 92 and biased toward closed position by its weight and by a spring 93 (Fig. 3). It serves to prevent back flow of air through conduit 7.

Referring to Fig. 1, it will be seen that motor 32 is fastened to the sides of conduits 6 and 7 by suitable straps 94 and that casing 47 which houses bellows 48 and 49 and associated parts likewise is fastened on the sides of these conduits. Rheostat 73 is carried by a bracket 95 attached to flange 5. Thus the entire mechanism is a unitary structure which is attached to the cabin wall through the intermediary of the three conduits 11, 12 and 75.

In Fig. 2 of the drawings, the various parts are shown in the positions they might occupy with the aircraft on the ground and the ejector not operating, the cabin being open to atmosphere for example. Valves 21, 27 and 91 are shown closed and valves 14 and 28 are shown in positions they might occupy at some certain temperature in the cabin. However, as soon as the cabin is sealed and the ejector is put into operation, the ejector will function to partially open valves 27 and 91 and effect flow of air through the cabin for ventilating the cabin while the aircraft is on the ground, is taxiing, or is at low altitude, as will be clear from the following description.

As soon as the cabin is sealed and air supplied to the ejector, the ejector functions to pump air from the cabin thus lowering the pressure in the cabin which means that the pressure supplied to the interior of bellows 48 is decreased. At this time, sliding valve 83 is open and since the aircraft power plant is operating, compressed air is supplied to the ejector.

Decrease of the pressure in bellows 48 will effect movement of lever 45 to bring the movable contact 44 of vacuum switch 43 into engagement with fixed contact 41, thus closing a circuit on field 33 of motor 32, effecting operation of the motor in a direction to move valves 21 and 27 toward open positions. The valves 21 and 27 will assume positions such that there is supplied through conduit 7 or through conduits 6 and 7 air of a pressure to restore lever 45 to its position of equilibrium wherein movable contact 44 stands between fixed contacts 41 and 42. Depending on operating conditions, this may be a position in which valve 21 is still closed and valve 27 is partly open or one in which both valves 21 and 27 are partly open. The pressure of the air flowing in conduit 7 will be sufficient to hold valve 91 open. When gear wheel 30 moves to effect movement of the valves 21 and 27, the tension of spring 54 is adjusted to increase its pull on lever 45 which means that to restore lever 45 to a position wherein movable contact 44 is moved out of engagement with fixed contact 41, the pressure in the cabin, i. e., in bellows 48, need not be restored to its former value but to a value somewhat less than its former value. Thus, there is introduced into the control a droop to give stability of operation. This condition of operation will obtain while the aircraft is on the ground and is taxiing, thus insuring ventilation of the cabin at these times.

Now when the aircraft gets under way and gains altitude, the pressure responsive device will operate after the manner described to adjust valves 27 and 21 to maintain the desired cabin pressure. After the aircraft gets under way, rammed air becomes available through conduit 10.

The temperature responsive device in the cabin operates to position valves 14 and 28 to effect regulation of the cabin temperature. Valve 28 affects the rate of flow of air through conduit 7. If the temperature is too low in the cabin, thermostatic member 66 will be moved to engage contact 65 to effect operation of motor 18 to move valve 28 toward closed position to reduce the flow through conduit 7 and to move valve 14 downward (as shown in Fig. 2) to decrease the flow through conduit 12 and cooler 13 and increase the flow through conduit 11. Decreasing the flow through conduit 7 by closing valve 28 somewhat serves to reduce the pressure in mixing chamber 2 and such reduction in pressure serves to effect adjustment of valves 21 and 27 in the manner already explained in an opening direction. Thus, valve 21 is opened to admit a greater amount of hot air to increase the temperature. At the same time, the pressure in mixing chamber 2 is restored. If the temperature in the cabin is too high, thermostatic member 66 engages fixed contact 64 to effect operation of motor 18 and the adjustment of valves 14 and 28 in the opposite directions. This then results in an increase in pressure in mixing chamber 2 which in turn effects a readjustment of valves 21 and 27 in the opposite direction to decrease the pressure and hence decrease the temperature.

There results that for any altitude, valves 21 and 27 and valves 14 and 28 become positioned to supply to the cabin air of the desired pressure and temperature and such pressure and temperature will be held by readjustment of the valves. It will be understood that if the pressure in the mixing chamber decreases, an operation similar to that already described in connection with an increase in pressure will effect operation of motor 32 in a direction to move valves 21 and 27 toward open positions.

The function of resistance 73 is to give a drooping characteristic to the thermostatic control to effect stable operation. When the valves 14 and 28 are moved in one direction or the other, the amount of resistance in series with the winding of electromagnet 72 is increased or decreased, thus varying its effect on the thermostatic element. This is a known arrangement. It forms no part of our present invention. Any suitable arrangement for giving droop to the thermostatic regulator to effect stable operation may be utilized.

In connection with the operation at lower altitudes, the supercharged air supplied through conduit 9, in a case where the air is being supplied from the discharge side of the compressor of a gas turbine power plant, may have a temperature of the order of 250° F. and a pressure of the order of 60 pounds per square inch absolute. And the air supplied through conduit 10 may have a pressure a few pounds higher than atmospheric pressure and a temperature substantially equal to ambient temperature. In the cabin, it may be desired to hold a pressure equal to ambient pressure less a predetermined amount up to a certain altitude after which it may be desirable to hold a pressure for each altitude a predetermined amount higher than ambient pressure. As to temperature, it may be desirable to decrease the cabin temperature with increase in altitude. The desired results may be obtained by selecting suitable characteristics for the control members.

At lower altitudes, and as long as flap valve 91 is open, the temperature control is effected primarily due to the adjustment of valve 28. At lower altitudes, the cooler 13 has but limited effect on the temperature of the air flowing through it so that the exact position of valve 14 and the division of the air between the two conduits 11 and 12 is not of major importance.

As the aircraft ascends, an altitude is reached at which flap valve 91 is closed, the cold rammed air having no longer sufficient pressure to hold it open. When this occurs, all the air for supercharging the cabin is supplied through conduit 9 from the hot supercharged air supply. With flap valve 91 closed, valves 27 and 28 in conduit 7 no longer have any effect on the air flow. The pressure and temperature of the air is then controlled by the two valves 21 and 14, valve 21 operating to increase and decrease the supply of supercharged air to the mixing chamber and valve 14 operating to effect a division of air between the two conduits 11 and 12 so that the air supplied to the cabin will have the desired temperature. At these higher altitudes, the ambient temperature is lower and therefore cooler 13 has a greater effect on the temperature of the air flowing through it.

At lower altitudes, the difference in pressure between the inside and outside of the cabin is relatively small so that the ejector is needed to effect circulation of air through the cabin. However, as the altitude increases, the difference in pressure between the inside and outside of the cabin increases so that less and less ejector action is needed to effect circulation through the cabin. The function of valve 83 is to begin to decrease the ejector action after a predetermined altitude is reached and finally at some altitude cut the ejector off altogether. The bellows 87 connected to ejector valve 83 and its spring 89 have characteristics such that after a predetermined altitude is reached, the bellows begins to distend, due to decrease in ambient pressure, thus moving valve 83 toward closed position. The valve is moved gradually toward closed position with increase in altitude and eventually at some desired altitude, the valve is entirely closed thus shutting off the ejector. The circulation of air through the cabin is now effected by the flow of air through conduit 75 and nozzle 78 due to difference in pressure between the inside and outside of the cabin. Nozzle 78 may have the capacity and be so designed that for the intended altitudes, the flow through the cabin after the ejector is shut off will be satisfactory for ventilating purposes and at the highest altitude will not be excessive. Also, the ejector functions to ventilate the cabin while the aircraft is on the ground, particularly while taxiing, since at this time sufficient air from the propeller slip stream is not available. While I now prefer to utilize an ejector as described, it will be understood that if desirable an ejector may be omitted.

It will be noted that the cabin discharge nozzle 78 extends across the mixing chamber 2 so that it is surrounded by warm air. This serves to prevent frosting of the nozzle.

As stated above, the pressure and temperature control devices may be selected and adjusted to have characteristics such that they maintain the desired cabin pressures and temperatures for the altitude range of the aircraft. In the case of the pressure control device, at lower altitudes the control is effected by bellows 48 alone or modified by spring 54. At a predetermined altitude, ambient pressure reaches a low value such that bellows 49 distends to a point where its movable end engages lever 45. It then serves to affect the control device by an amount dependent upon the altitude, the force acting on lever 45 being that of bellows 48 as modified by spring 54 and bellows 49. By way of example, but not by way of limitation of our invention, the pressure control device may have characteristics such that after takeoff and below an altitude of about 15,000 feet, the regulator will maintain the cabin pressure at one-fourth to three-fourths pounds per square inch above ambient pressure; and above 15,000 feet altitude, at which time bellows 49 may come into action, the regulator will maintain the cabin pressure at one-half ambient pressure plus 5 pounds. This means a continuously decreasing cabin pressure with increase in altitude. However, if desired, constant or substantially constant cabin pressure may be maintained.

Suitable manual means may be provided for adjusting the setting of the thermostat as is well understood.

Valve 24 is in the nature of an emergency valve which may be closed to shut off all hot air, a thing which, at higher altitudes when flap valve 91 is closed, would put the entire system out of operation. Its operating means 25 may be located at any suitable point where it is readily accessible to the aircraft operator.

Referring to valves 27 and 28 which control flow through conduit 7, it will be seen that they mutually cooperate in regulating such flow and in substance form a single valve means positioned by cabin pressure and temperature. If found desirable, a single valve may be used instead of the two valves 27 and 28. Such a modification is shown in Fig. 4 wherein 100 indicates a conduit corresponding to conduit 7 of Figs. 1 to 3 in which is located a single valve 101 connected by a link 102 to an intermediate point of a floating lever 103 one end of which is connected by a link 104 to the pressure control mechanism and the other end by a link 105 to the temperature control mechanism.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States, is:

1. In a cabin supercharger system, the combination of an air mixing chamber, a first discharge conduit connecting the mixing chamber to the cabin, a second discharge conduit connecting the mixing chamber to the cabin, an air cooler in the second conduit, valve means for apportioning flow of air from the mixing chamber to said two conduits, a first supply conduit for supplying hot supercharged air to the mixing chamber, a second supply conduit for supplying rammed air to the mixing chamber, a valve in each supply conduit, means responsive to cabin pressure for adjusting said two valves, a second valve in said second supply conduit, and means responsive to cabin temperature for adjusting said second valve and said valve means.

2. In a cabin supercharger system, the combination of an air mixing chamber, a first discharge conduit connecting the mixing chamber to the cabin, a second discharge conduit connecting the mixing chamber to the cabin, an air cooler in the second conduit, valve means for apportioning flow of air from the mixing chamber to said two conduits, a first supply conduit for supplying hot supercharged air to the mixing chamber, a second supply conduit for supplying rammed air to the mixing chamber, a valve in each supply conduit, means responsive to cabin pressure for adjusting said two valves, the valve in said second supply conduit being partly opened in advance of the valve in said first supply conduit, cabin temperature responsive means, and means including said valve means adjusted by said temperature responsive means to regulate the temperature in the cabin.

3. In a cabin supercharger system, the combination of a mixing chamber, a pipe for conveying air from the mixing chamber to the cabin, a first conduit for supplying hot pressurized air to the mixing chamber, a second conduit for supplying rammed air to the mixing chamber, valve means for regulating the flow through the second conduit, means responsive to cabin pressure and to cabin temperature for positioning said valve means, other valve means for regulating the flow through the first conduit and means responsive to cabin pressure for positioning said other valve means.

4. In a cabin supercharger system, the combination of a mixing chamber, a first pipe for conveying air from the mixing chamber to the cabin, a second pipe for conveying air from the mixing chamber to the cabin, a heat exchanger in one of said pipes, valve means in the mixing chamber for apportioning flow of air from the mixing chamber through said two pipes to the cabin, a first conduit for supplying hot pressurized air to the mixing chamber, a second conduit for supplying rammed air to the mixing chamber, valve means in said conduits, means responsive to cabin pressure for positioning the valve means in said first conduit, and means responsive to cabin temperature for positioning the valve means in said second conduit and the valve means in the mixing chamber.

5. In a cabin supercharger system, the combination of a mixing chamber, a first pipe for conveying air from the mixing chamber to the cabin, a second pipe for conveying air from the mixing chamber to the cabin, a heat exchanger in one of said pipes, valve means in the mixing chamber for apportioning flow of air from the mixing chamber through said two pipes to the cabin, a first conduit for supplying hot pressurized air to the mixing chamber, a second conduit for supplying rammed air to the mixing chamber, valve means in said first and second conduits, means responsive to cabin pressure for positioning said last-named valve means, means responsive to cabin temperature for positioning both the valve means in said second conduit and said valve means in the mixing chamber, and a check valve for preventing back flow through said rammed air supply conduit.

6. In a cabin supercharger system, a sealed cabin, means for supplying supercharged air to the cabin, means responsive to cabin pressure and to cabin temperature for regulating said air supplying means, a conduit communicating with the cabin, an ejector in said conduit for effecting flow of air through said sealed cabin, a conduit for supplying supercharged air from the supply means to the ejector for the actuation thereof and means associated with said last-named conduit and responsive to altitude pressure for shutting off the supply of supercharged air to said ejector when a predetermined altitude is reached.

7. In a cabin supercharger system, a sealed cabin, means for supplying supercharged air to the cabin, means responsive to cabin pressure and to cabin temperature for regulating said air supplying means, a conduit communicating with the cabin, an ejector in said conduit for effecting flow of air through said sealed cabin, a conduit for supplying supercharged air from the supply means to the ejector for the actuation thereof, and means associated with said last-named conduit and responsive to altitude pressure for gradually shutting off the supply of supercharged air to said ejector.

8. In a cabin supercharger system, conduit means including air cooling means and a mixing chamber for conveying air to the cabin, a pipe for supplying hot supercharged air to the mixing chamber, a pipe for supplying rammed air to the mixing chamber, valve means in said pipes, means responsive to cabin pressure for positioning said valve means, and means responsive to cabin temperature for regulating the cooling effect of said air cooling means on the air flowing to the cabin.

9. In a cabin supercharger system, a sealed cabin, a mixing chamber, conduit means including air cooling means for conveying air from the mixing chamber to the cabin, a first pipe for conveying hot supercharged air to the mixing chamber, a second pipe for conveying rammed air to the mixing chamber, valve means in said pipes, an actuating device for said valve means controlled by cabin pressure, other valve means in said second pipe, an actuating device for said other valve means controlled by cabin temperature, and condition-responsive means controlled by cabin temperature for regulating the cooling effect of said cooling means on the air flowing through said conduit means to the cabin.

10. In a cabin supercharger system, a sealed cabin, a mixing chamber, first conduit means including air cooling means for conveying air from the mixing chamber to the cabin, second conduit means for conveying hot supercharged air to said mixing chamber, third conduit means for conveying rammed air to said mixing chamber, automatic valve means associated with said second and third conduit means and actuated by a device responsive to cabin pressure for modifying the flow to the mixing chamber of both supercharged air and rammed air, and automatic valve means associated with said first and third conduit means and actuated by a device responsive to cabin temperature for modifying the flow of rammed air to the mixing chamber and regulating the cooling effect of said cooling means on the air flowing through said first named conduit means.

11. In a cabin supercharger system, a sealed cabin, a mixing chamber, conduits for supplying air of different pressures and temperatures to said mixing chamber, conduit means for conveying air from the mixing chamber to the cabin, cabin pressure and cabin temperature responsive means for regulating the air flow in said conduits, and means for discharging air from the cabin including a nozzle arranged in heat exchange relation with the mixing chamber so as to prevent frosting of the nozzle.

12. In a cabin supercharger system, a sealed cabin, a mixing chamber, conduits for supplying air of different pressures and temperatures to said mixing chamber, conduit means for conveying air from the mixing chamber to the cabin, cabin pressure and cabin temperature responsive means for regulating the air flow in said conduits, means for discharging air from the cabin including a nozzle arranged in heat exchange relation with the mixing chamber so as to prevent frosting of the nozzle, and ejector means for effecting flow of air through the cabin and out said discharge nozzle.

13. In a cabin supercharging system, a sealed cabin, a mixing chamber, a source of hot supercharged air, first conduit means connecting the hot air source to the mixing chamber, a source of cold rammed air, second conduit means connecting the cold air source to the mixing chamber, third conduit means connecting the mixing chamber to the cabin and including air cooling means, a first control mechanism responsive to cabin pressure, a second control mechanism responsive to cabin temperature, valve means associated with said first conduit means and positioned by said first control mechanism for regulating the flow of pressurized air, valve means associated with said second conduit means and positioned by said second control mechanism for regulating the flow of cold air to the mixing chamber, and third valve means positioned by said second control mechanism for regulating the air cooling means.

DONALD F. WARNER.
EARL L. AUYER.